United States Patent

Bergstrom

Patent Number: 5,897,177
Date of Patent: Apr. 27, 1999

[54] STUD HAVING A MULTIFACETED SURFACE FOR USE ON A TREAD ELEMENT

[76] Inventor: Scott T. Bergstrom, 11974 Blue Spruce Dr., Roscoe, Winnebago County, Ill. 61073

[21] Appl. No.: 08/925,695

[22] Filed: Sep. 9, 1997

[51] Int. Cl.$^6$ .................................................. B62D 55/26
[52] U.S. Cl. ......................... 305/160; 305/180; 305/192; 152/210
[58] Field of Search ................................. 305/160, 161, 305/162, 180, 192; 152/210, 211

[56] References Cited

U.S. PATENT DOCUMENTS

| | | |
|---|---|---|
| 857,745 | 6/1907 | Mesinger ............................... 152/210 |
| 862,435 | 8/1907 | Bartel .................................... 152/210 |
| 1,065,949 | 7/1913 | Lorme .................................... 152/210 |
| 1,335,691 | 3/1920 | Lambert . |
| 2,065,312 | 12/1936 | Jackson . |
| 2,310,467 | 2/1943 | Schwab . |
| 2,572,996 | 10/1951 | Dunlap . |
| 3,120,863 | 2/1964 | Coate . |
| 3,124,191 | 3/1964 | Forslund . |
| 3,125,147 | 3/1964 | Hakka . |
| 3,220,455 | 11/1965 | Sowko . |
| 3,663,644 | 5/1972 | Dock . |
| 3,717,189 | 2/1973 | Gutshall . |
| 3,749,146 | 7/1973 | DeCaro . |
| 3,767,275 | 10/1973 | Russ, Sr. . |
| 3,779,299 | 12/1973 | Baum . |
| 3,779,617 | 12/1973 | Palmaer . |
| 3,827,885 | 8/1974 | Baum . |
| 3,894,575 | 7/1975 | Baum . |
| 3,912,338 | 10/1975 | Toews . |
| 5,284,386 | 2/1994 | Rubel . |
| 5,458,174 | 10/1995 | Wessel . |

*Primary Examiner*—Russell D. Stormer
*Attorney, Agent, or Firm*—Leydig, Voit & Mayer, Ltd.

[57] ABSTRACT

A stud for improving the traction of a tread element is provided. The stud includes a body portion including a head and an elongated shank portion extending from the head. A mound of particles of a hard and durable material is bound together on and to the head of the stud such that the mound of particles has a multifaceted surface including multiple points which can engage the terrain.

13 Claims, 3 Drawing Sheets

STUD HAVING A MULTIFACETED SURFACE FOR USE ON A TREAD ELEMENT

FIELD OF THE INVENTION

This invention generally relates to a device for improving traction and, more particularly, to a stud for improving the traction of a tread element of an all terrain vehicle or the like.

BACKGROUND OF THE INVENTION

Vehicles which are designed to be driven over adverse terrain such as snow, ice, mud, or uneven terrain must utilize tires or an endless track which provides excellent traction. Examples of such vehicles include snowmobiles, excavating equipment, some snow removal equipment, and other similar all terrain vehicles. In order to further improve the traction all terrain vehicles it is known to incorporate traction devices into the surface of the vehicle's tires or tracks. These traction devices typically include some sort of penetrating device which penetrates the surface over which the vehicle is traveling in order to improve the traction of the vehicle. The penetrating surface of these traction devices is generally configured as a single point in order to ensure deep penetration into the surface of the terrain. For example, conventional studs which are used on the tires and/or tracks of all terrain vehicles utilize a hardened material having a single pointed wedge or cone configuration. The hardened pointed wedge or cone is typically contained in a bore in a metal body.

However, these conventional studs are not very durable and have poor resistance to wear. In particular, the single point of the conventional stud frequently will break off during use, significantly decreasing the effectiveness of the stud. Moreover, if the single point of the stud does not break off its pointed cone or wedge shape will wear into a rounded configuration as a result of use. Once the stud loses its sharp point it is not nearly as effective at improving the traction of the vehicle. As a result, conventional studs which are used on tracks require frequent changing in order to ensure that the stud has a sharp surface which will effectively penetrate the terrain. However, as those skilled in the art will appreciate, changing a set of studs on the tire and/or tracks of an all terrain vehicle is a difficult and time consuming task.

OBJECTS AND SUMMARY OF THE INVENTION

Accordingly, in view of the foregoing it is a general object of the present invention to provide a stud for attachment to a tread element which provides excellent traction and is durable and resistant to wear.

A further. object of the present invention is to provide a stud for attachment to a tread element which continues to provide excellent traction even as the stud wears.

The present invention provides these and other advantages with a stud having a multifaceted engagement surface which can be used to significantly enhance the traction of a tread element. The stud includes a body portion including a head and an elongated shank portion extending from the head. A mound of particles of a hard and durable material is bound together on and to the head of the stud such that the mound of particles has a multifaceted surface including multiple points which can engage the terrain. These multiple traction or engagement points which are presented by the multi-faceted surface significantly increase the gripping power and wear resistance of the stud as compared to conventional single point studs. In addition, the mound of particles preferably includes several layers of particles so that as the individual particles which form the top layer of the mound wear or break off, the sharp edges or points of the underlying layers of particles are exposed. Thus, as the stud wears it retains its superior gripping ability and durability.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 4 is a partially cut away side view showing the stud of FIG. 1 attached to one type of tread configuration for an all terrain vehicle or the like.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

The present invention generally relates to a stud which has a multifaceted surface including multiple sharp points that can penetrate terrain and thereby provide improved traction. The multifaceted stud of the present invention offers numerous advantages over conventional studs having a single point. For example, instead of a single traction point, the multifaceted surface of the stud of the present invention provides multiple traction points which improve the stud's grip on the terrain. The multiple traction points also allow the forces acting on the stud to be divided over several points. This reduces the magnitude of the forces that are acting on the individual points and makes the stud of the present invention more resistant to wear. In addition, as the multifaceted surface of the stud wears, it continues to present multiple sharp points thereby ensuring that that stud continues to provide excellent traction over time. The stud of the present invention can be used to improve the traction of any type of tread element and is particularly well suited for use on the treads of tires or endless tracks of all terrain vehicles such as snowmobiles, construction equipment, excavating equipment and snow removal equipment. However, those skilled in the art will appreciate that the stud of the present invention may also be used to improve the traction of other types of tread elements including for example boots or shoes in order to make them more conducive for use on a particularly slippery surface such as ice or snow.

Figure 1:
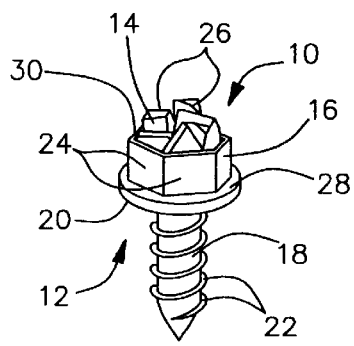
FIG. 1 is perspective view of a stud constructed in accordance with one embodiment of the present invention.
Figure 2:
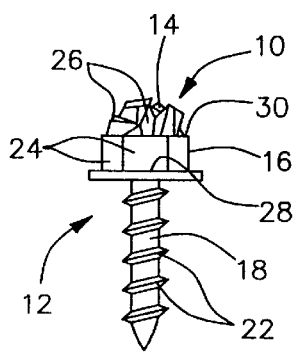
FIG. 2 is a side elevation view of the stud of FIG. 1.
Figure 3:
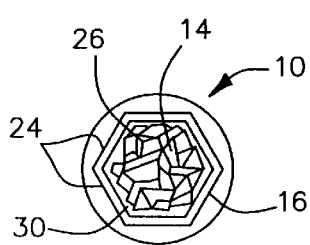
FIG. 3 is a top plan view of the stud of FIG. 2.
Figure 4:
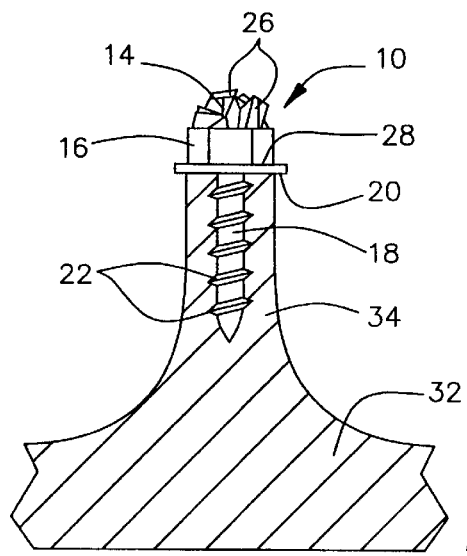
Figure 5:
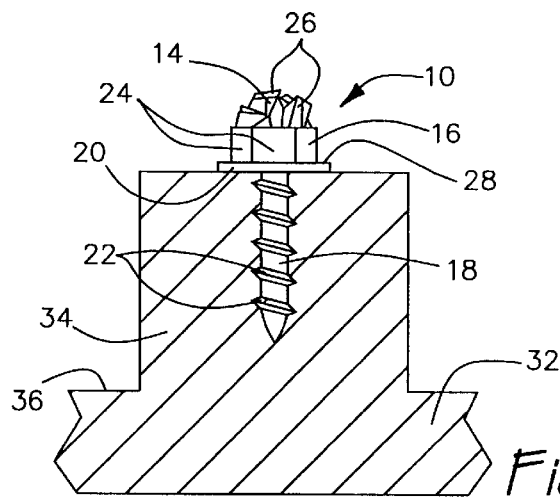
FIG. 5 is a partially cut away side view showing the stud of FIG. 1 attached to a different type of tread configuration.
Figure 6:
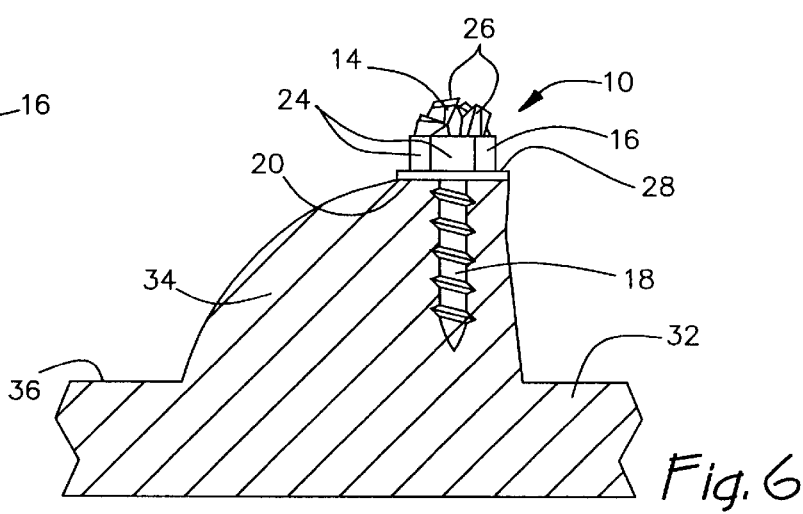
FIG. 6 is a partially cut away side view showing the stud of FIG. 1 attached to yet another type of tread configuration.

Referring now to the drawings, FIGS. 1–3 illustrate one embodiment of a stud 10 constructed in accordance with the teachings of the present invention. The stud 10 generally includes a body 12 and a multifaceted mound portion 14. As best shown in FIG. 2, the body 12 comprises a head portion 16 and an elongated shank portion 18 extending from the lower surface 20 of the head. In the illustrated embodiment, the shank 18 is threaded in order to allow the stud 10 to be easily and securely attached to the tread of a tire or endless track as shown in FIGS. 4–6. In a further embodiment, the threads 22 of the shank portion 18 may be self-tapping in order to further ease attachment and replacement of the studs 10. As best shown in FIG. 3, the sides 24 of the head portion 16 preferably form a polygonal shape, which in the illustrated embodiment is more specifically a hexagonal shape. The hexagonal shape of the head portion 16 enables the stud 10 to be installed and changed quickly and easily through the use of a conventional driving device such as a power wrench.

In order to provide the stud 10 with multiple traction or gripping points, a mound 14 of particles or chips is attached to the upper surface 28 of the head portion 16. The chips or particles 26 which form the mound 14 define a multifaceted surface which includes a plurality of sharp points which can penetrate the terrain thereby giving the stud 10 increased gripping ability as compared to conventional single point studs. Specifically, the mound 14 comprises a plurality of particles or chips 26 of a tough wear resistant material such as carbide which are brazed or soldered together and to the upper surface 28 of the head 16 with a suitable binding material such as silver. Furthermore, the mound 14 preferably comprises several layers of particles. The particles 26 preferably are of size such that they pass through a number 8 mesh and are retained in a 14 mesh, with particles which pass through a 10 mesh and are retained in a 16 mesh being most preferable.

The multifaceted surface which is provided by the mound 14 of particles gives the stud 10 improved wear characteristics as compared to conventional single point studs. In particular, as opposed to the magnitude of the forces caused by the engagement of the stud with the terrain being applied on a single point, the multifaceted surface of the mound 14 allows the forces to be divided between multiple engagement points thereby allowing the stud 10 to be more resistant to wear than conventional studs. The multifaceted surface also enables the stud 10 to maintain a plurality of sharp points even as it wears over time. Specifically, as the individual particles 26 which form the top layer of the mound 14 wear or break off, the sharp edges and points of the particles 26 in the underlying layers of the mound 14 are exposed. Thus, in sharp contrast to conventional single point studs which provide less traction as they wear because the single point breaks off or becomes rounded, the multifaceted mound 14 of particles ensures that the enhanced traction provided by the stud 10 is maintained even as the stud wears.

Figure 10:
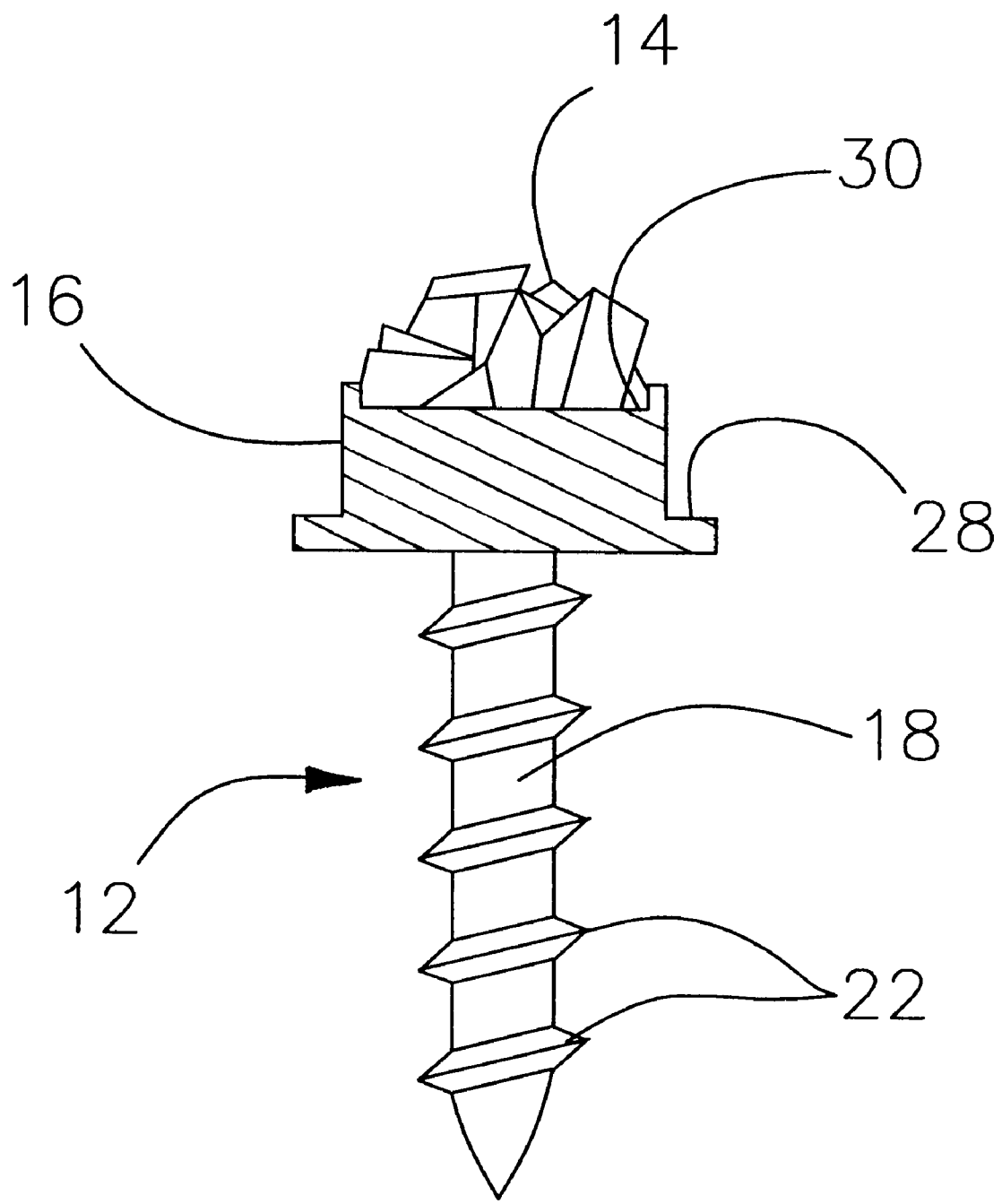
FIG. 10 is a partial side sectional view of head portion of the stud of FIG. 1.

In order to help stabilize the mound 14 of the particles, the upper surface 28 of the head 16 includes a recessed cavity 30 which is best shown in FIGS. 3 and 10. The recessed cavity 30 also helps to ensure that the mound 14 of particles does not obstruct the hexagonal-shaped sides 24 of the head portion. Preferably, the head 16 and, in particular, the recessed cavity 30 are sized such that a mound 14 which has a base approximately 0.250 inches in diameter and approximately 0.040 inches high can be formed on the upper surface 28 of the head 16.

With the present invention there is also no need to specially fabricate a stud body having a complex or intricate shape. In particular, in one preferred embodiment of the invention, the body 12 of the stud can simply comprise a ½ inch or #10 sheet metal screw. Thus, the present invention also offers a significant cost advantage over many conventional studs which utilize a carbide pin which is supported in a metal body having a specially fabricated intricate shape.

The use of a mound of carbide particles also enables the stud 10 to use approximately the same amount of carbide which is found in conventional studs but with a much shorter profile. The shorter profile of the stud 10 allows it to be easily attached to the raised portion, or so-called lug 34, of a tire or track tread 32. For example, instead of having to be attached in a land area 36 between the lugs 34 of a tread element, such as for example on a snowmobile track, as do many longer conventional studs, the stud of the present invention can be attached directly to the apex of a lug 34. FIGS. 4–6 illustrate how the stud 10 can be attached to lugs 34 having various different configurations. The ability of the stud 10 to be attached directly to the raised lug 34 of a tire or track tread helps to maximize the improved traction which is offered by the present invention.

Figure 7:
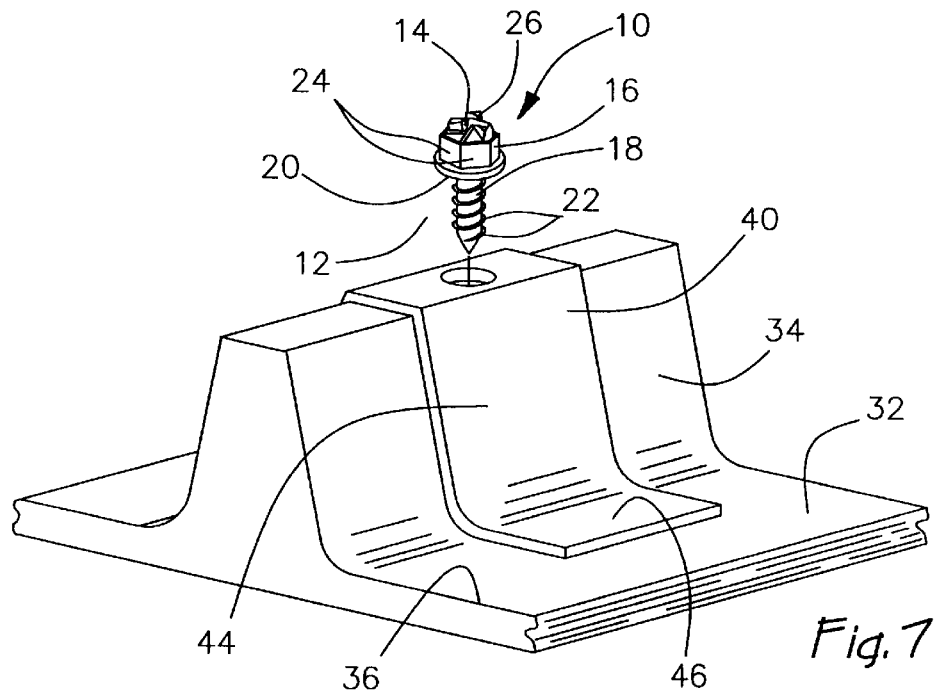
FIG. 7 is a front perspective view showing the stud of FIG. 1 being used with one embodiment of a support bracket.
Figure 8:
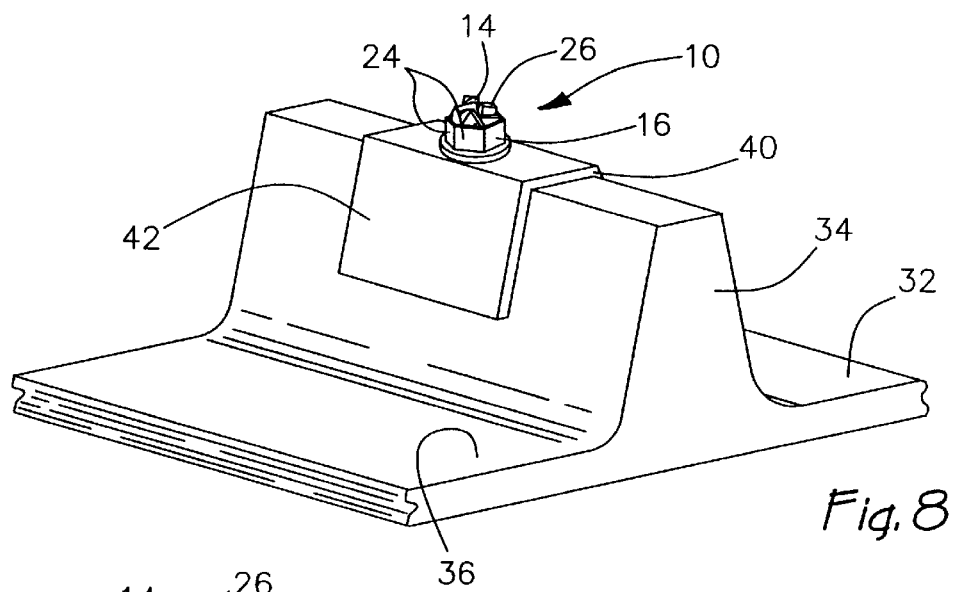
FIG. 8 is a rear perspective view of the stud and support bracket of FIG. 7.
Figure 9:
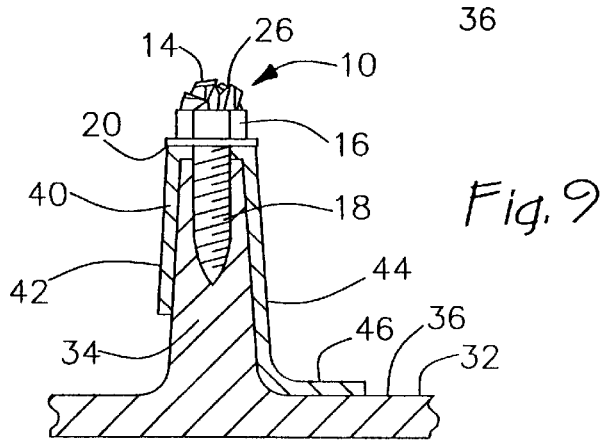
FIG. 9 is a partially cutaway side view of the stud and support bracket of FIG. 7

Attaching the stud 10 directly to a lug 34, however, will subject the lug to greater forces and torques because of the increased traction which is provided by the stud of the present invention. Thus, in some cases, particularly when using tracks having higher and thinner lugs a support bracket 40 should be provided for the lug 34. One embodiment of a support bracket 40 which is suitable for this purpose is shown in FIGS. 7–9. The support bracket 40 straddles the lug 34 and, in particular, has a pair of legs 42, 44 which run along or overlie the opposing sides of the lug 34. One of the legs 44 includes an extended arm 46 which lies along the surface of the tread element 32 in order to keep the supported lug from bending or collapsing.

Thus, a novel and improved stud which can be attached to any type of tread element has been described. The stud provides improved gripping power and is extremely durable and more resistant to wear than conventional studs. Moreover, as the stud wears, it continues to provide excellent traction. Thus, the stud can be used for relatively long period of time before replacement is required. In addition to superior wear characteristics, the stud of the present invention is both lightweight and easy to install.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A stud for improving the traction of a tread element, the stud comprising:

a body portion including a head and a shank portion extending from the head, and a mound of particles of a hard and durable material bonded together on and to an upper surface of the head of the body portion such that substantially the entire mound of particles is exposed forming a multifaceted surface which defines a plurality of sharp points distributed across the entire surface of the mound for engaging terrain.

2. The stud of claim 1 wherein the particles are carbide.

3. The stud of claim 1 wherein the mound of particles includes a plurality of layers of particles.

4. The stud of claim 1 wherein the particles are between a 10 to 14 standard grit size.

5. The stud of claim 1 wherein the shank portion is threaded.

6. The stud of claim 5 wherein the threads on the shank portion are self-tapping.

7. The stud of claim 5 wherein the shank portion is at least 3/8 inch long.

8. The stud of claim 1 wherein the body comprises a number 10 sheet metal screw.

9. The stud of claim 1 wherein the head includes a recessed cavity to provide stability for the mound of particles.

10. The stud of claim 1 wherein the head has a plurality of sides which form a polygonal shape that can be engaged by a driving device.

11. The stud of claim 10 wherein the sides of the head are unobstructed by the mound of particles.

12. The stud of claim 1 wherein the mound of particles is at least approximately 7/64 inch high.

13. The stud of claim 1 wherein the particles are brazed together to and on the head of the body.

* * * * *